(12) United States Patent
Achenbach et al.

(10) Patent No.: US 12,372,111 B2
(45) Date of Patent: Jul. 29, 2025

(54) SCREW FOR SCREWING INTO PLASTIC

(71) Applicant: EJOT GMBH & CO. KG, Bad Berleburg (DE)

(72) Inventors: Michael Achenbach, Breidenbach (DE); Juergen Behle, Bad Laasphe (DE); Ralf Birkelbach, Bad Laasphe (DE); Volker Dieckmann, Bad Berleburg (DE); Frank Dratschmidt, Bad Berleburg (DE); Jan Hackler, Bad Berleburg (DE); Rene Gerber, Fronhausen (DE); Ralph J. Hellmig, Bad Laasphe (DE); Ilir Selimi, Biedenkopf (DE); Stephan Weitzel, Bad Laasphe (DE)

(73) Assignee: EJOT GmbH & Co. KG, Bad Beleburg (DE)

( * ) Notice: Subject to any disclaimer, the term of this patent is extended or adjusted under 35 U.S.C. 154(b) by 0 days.

(21) Appl. No.: 17/251,795

(22) PCT Filed: Jun. 21, 2019

(86) PCT No.: PCT/EP2019/066531
§ 371 (c)(1),
(2) Date: Dec. 12, 2020

(87) PCT Pub. No.: WO2019/243606
PCT Pub. Date: Dec. 26, 2019

(65) Prior Publication Data
US 2021/0364030 A1    Nov. 25, 2021

(30) Foreign Application Priority Data
Jun. 21, 2018    (DE) .................. 10 2018 114 984.0

(51) Int. Cl.
*F16B 35/04*    (2006.01)
*F16B 2/06*    (2006.01)

(52) U.S. Cl.
CPC ............ *F16B 35/041* (2013.01); *F16B 2/065* (2013.01)

(58) Field of Classification Search
CPC ........................ F16B 35/041; F16B 25/0057
See application file for complete search history.

(56) References Cited

U.S. PATENT DOCUMENTS 3,351,115 A    11/1967    Boehlow
3,426,642 A    2/1969    Phipard
(Continued)

FOREIGN PATENT DOCUMENTS

CN    201461667    5/2010
DE    2543960 A1    4/1977
(Continued)

OTHER PUBLICATIONS

Machine translation of DE-102015120470-A1 (Year: 2017).*
(Continued)

*Primary Examiner* — Kyle A Cook
(74) *Attorney, Agent, or Firm* — WOODLING, KROST AND RUST

(57) ABSTRACT

The invention relates to a screw (IO) in order to cut a mating thread in a plastic article, comprising a lower threaded part (F) and an upper threaded part (T), the lower threaded part having a larger diameter and its tip covering a larger surface than the upper threaded part.

25 Claims, 12 Drawing Sheets

(56) References Cited

U.S. PATENT DOCUMENTS

| | | | |
|---|---|---|---|
| 3,527,136 | A | 9/1970 | Wilson |
| 3,861,269 | A | 1/1975 | Laverty |
| 3,878,759 | A | 4/1975 | Carlson |
| 4,572,740 | A | 2/1986 | Kretzschmann et al. |
| 5,795,120 | A | 8/1998 | Hurdle |
| 5,800,107 | A | 9/1998 | Giannuzzi |
| 6,296,432 | B1 | 10/2001 | Kato |
| 7,021,877 | B2 | 4/2006 | Birkelbach et al. |
| 7,255,523 | B2 | 8/2007 | Laan |
| 8,684,646 | B2 | 4/2014 | Pritchard |
| 9,404,524 | B2 | 8/2016 | Pritchard |
| 9,790,979 | B2 | 10/2017 | Toril |
| 2004/0081535 | A1 | 4/2004 | Birkelbach et al. |
| 2007/0014973 | A1 | 1/2007 | Koda et al. |
| 2009/0047095 | A1 | 2/2009 | Pritchard |
| 2015/0010374 | A1* | 1/2015 | Park .................. F16B 25/0063 411/387.1 |
| 2015/0023761 | A1 | 1/2015 | Pritchard |
| 2017/0122356 | A1 | 5/2017 | Lajewardi et al. |
| 2017/0254352 | A1 | 9/2017 | Chen |
| 2018/0209465 | A1* | 7/2018 | Lin ..................... F16B 25/0052 |
| 2019/0309784 | A1* | 10/2019 | Lajewardi ........... F16B 25/0052 |
| 2021/0222720 | A1* | 7/2021 | Jakob .................. F16B 25/0078 |

FOREIGN PATENT DOCUMENTS

| | | | |
|---|---|---|---|
| DE | 102015120470 A1 * | 6/2017 | .......... F16B 25/0026 |
| EP | 1775483 | 4/2007 | |
| EP | 1887233 | 2/2008 | |
| EP | 1887233 A2 | 2/2008 | |
| JP | 111062933 | 3/1999 | |
| JP | 20010107932 A | 4/2001 | |
| JP | 2012072840 A | 12/2012 | |
| JP | 5243906 | 7/2013 | |
| RU | 2292491 | 1/2007 | |
| RU | 2647349 | 3/2018 | |
| TW | 201137246 | 11/2011 | |
| TW | 201740026 | 11/2017 | |
| WO | 0212736 | 2/2002 | |
| WO | 2017088947 | 6/2017 | |

OTHER PUBLICATIONS

Machine translation of EP1887233 (Year: 2008).*
Intellectual Property Office of Singapore, Office Action, Apr. 28, 2022, pp. 1-9, Patent Application No. 11202012665X.
The State Intellectual Property Office of China, Office Action, Mar. 25, 2021, pp. 1-9, Application No. 201980041366.4.
The State Intellectual Property Office of China, English Translation of Office Action, Mar. 25, 2021, pp. 1-9, Application No. 201980041366. 4.
German Search Report, DE 10 2018 114 984.0, Mar. 15, 2019.
International Search Report, PCT/EP2019/066531, Sep. 24, 2019.
Written Opinion, PCT/EP2019/066531, No Date Given.
Japan Patent Office, Notification of Reasons for Refusal, Office Action, Nov. 29, 2022, pp. 1-5.
Japan Patent Office, English Translation of Notification of Reasons for Refusal, Office Action, Nov. 29, 2022, pp. 1-5.
Taiwan Intellectual Property Office of the Ministry of Economic Affairs, Office Action, Jul. 20, 2022, pp. 1-12.
Wisdom International Patent & Law Office, Translation of the Office Action From the Taiwan Intellectual Property Office of the Ministry of Economic Affairs, Jul. 20, 2022, pp. 1-11.
Russian Office Action and Translation For Application No. 2020141132/ 28(076601) Dated Jul. 26, 2022, pp. 1-12.
Russian Office Action and Translation For Application No. 2020141132/ 28(076601) Dated Jun. 10, 2021, pp. 1-70.
Korean Intellectual Property Office, Application No. 10-2021-7001884, Screw for Screwing Into Plastic, pp. 1-25, Dated Dec. 13, 2023, With English Translation.
Third Party Observation, Patent Application No. 20200-570951, pp. 1-9, Dated Apr. 30, 2024, With English Translation.
Machine translation of JP2012072840A, Dec. 4, 2012, Kitamura Seiko KK.

* cited by examiner

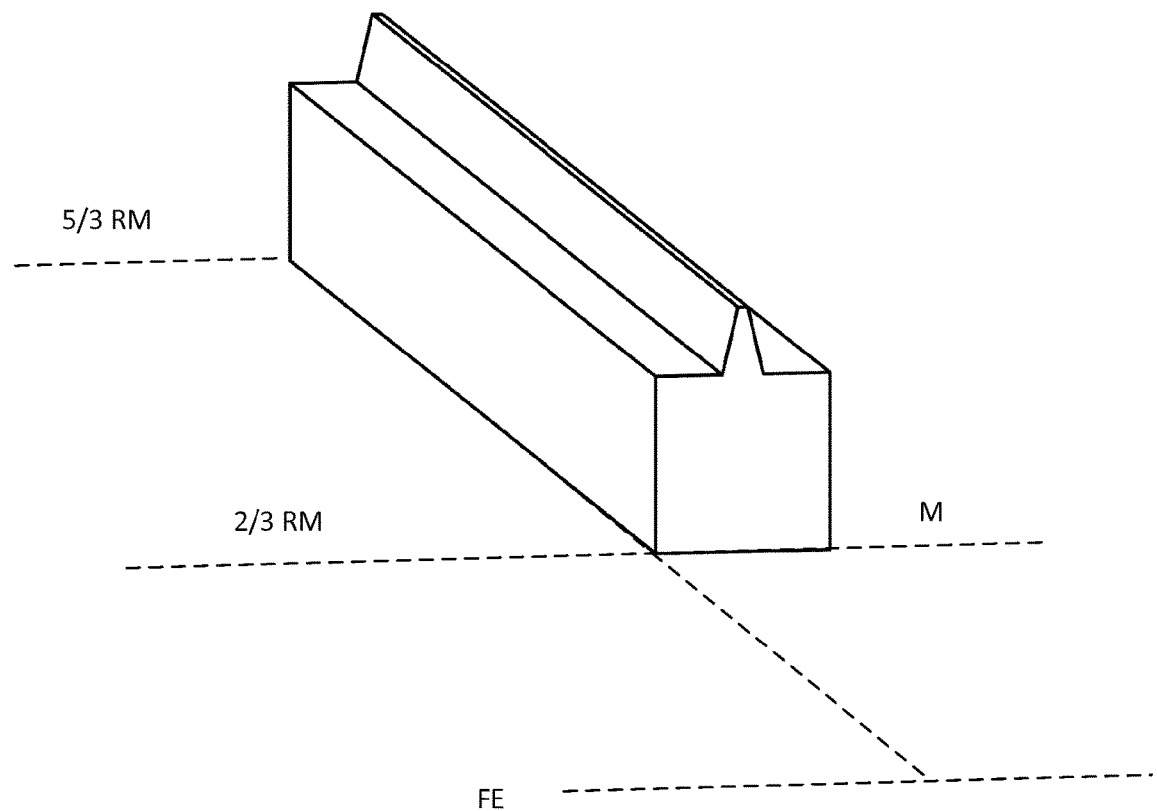
Fig. 5a
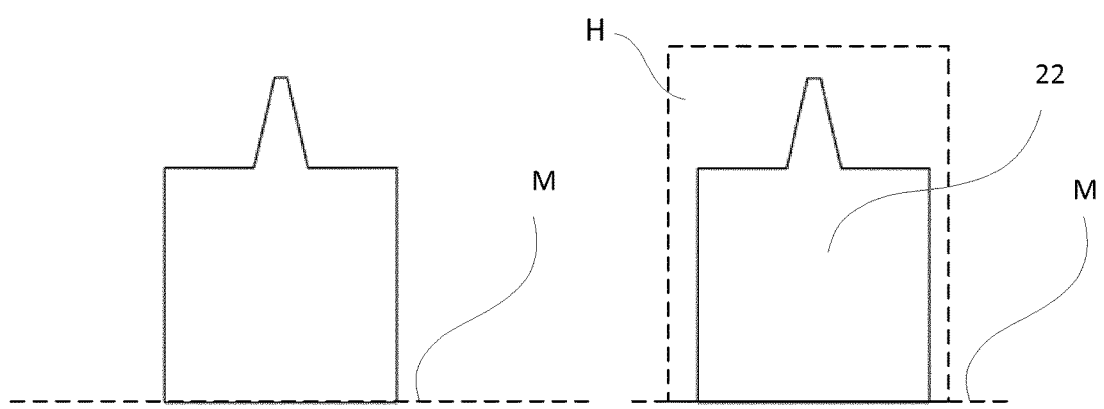
Fig. 5b Fig. 5c

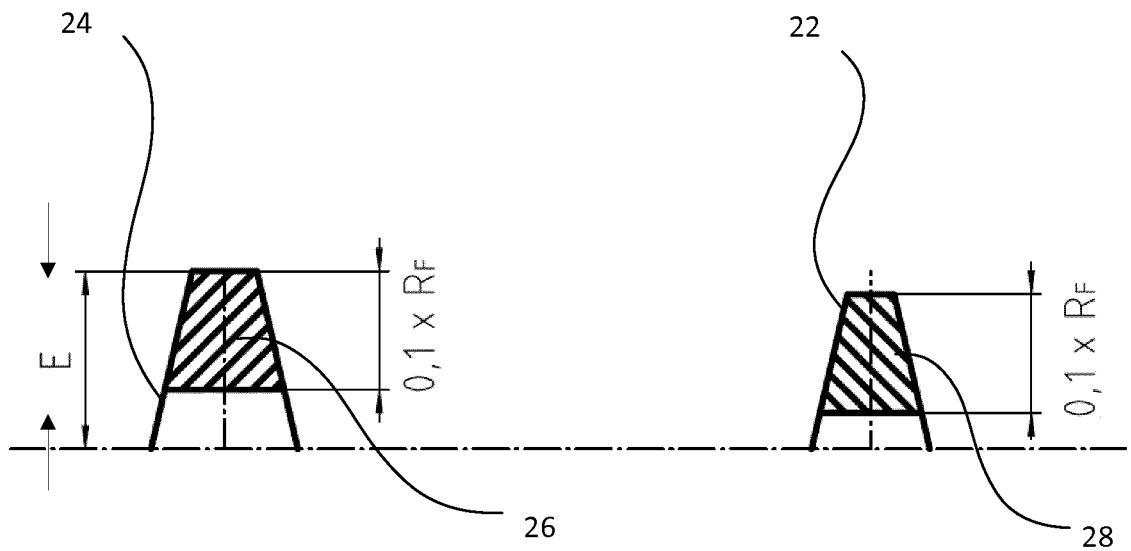
Fig. 8a          Fig. 8b
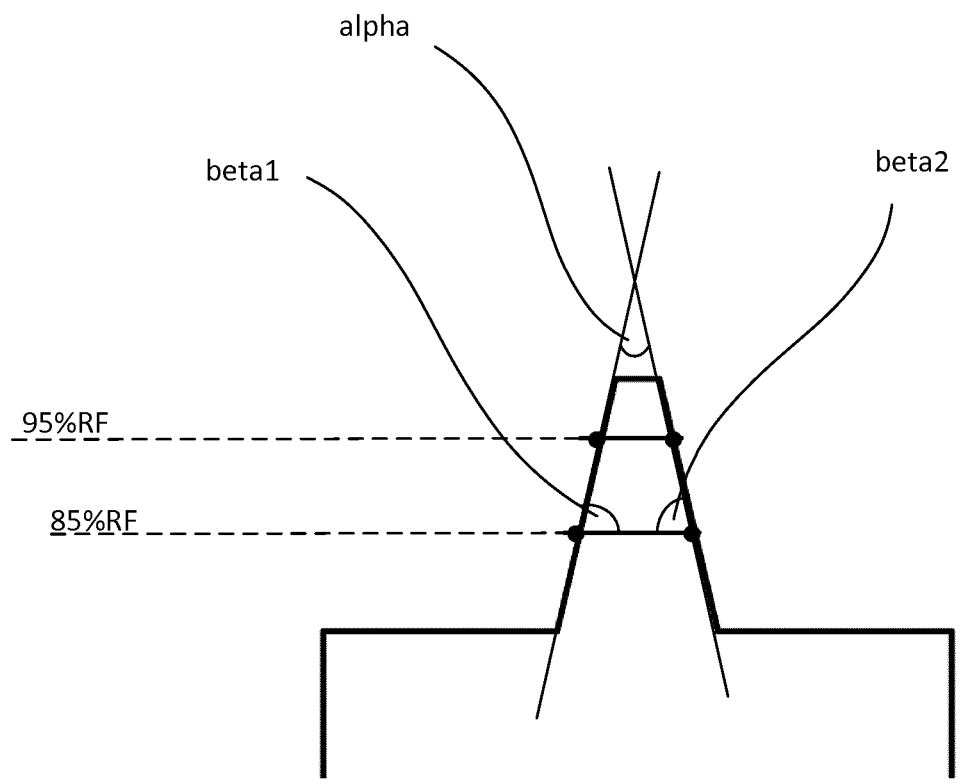
Fig. 9

SCREW FOR SCREWING INTO PLASTIC

This patent application is the national phase entry of PCT/EP2019/066531, international application filing date Jun. 21, 2019, which claims the benefit and priority of and to German patent application no. 10 2018 114 984.0, filed Jun. 21, 2018.

PCT/EP2019/066531, international application filing date Jun. 21, 2019 and German patent application no. 10 2018 114 984.0, filed Jun. 21, 2018 are incorporated herein by reference hereto in their entireties.

FIELD OF THE INVENTION

The invention relates to a screw, in particular for screwing into plastic.

BACKGROUND OF THE INVENTION

U.S. Pat. No. 5,795,120 B discloses a screw for insertion into a component having a pilot hole made therein. The screw has a forming thread region and a bearing thread region, with the thread profile in the forming thread region being proportionally larger than the thread profile in the bearing thread region.

The disadvantage of this design is that, especially when the screw is used in plastic materials, a high load will act on the component if a larger pitch and a smaller flank angle are to be realized for the screw.

SUMMARY OF THE INVENTION

It is the object of the invention to provide a screw that has a low insertion torque yet results in a low mechanical load on the component and at the same time ensures high pullout values.

In a manner known per se, a screw has a screw center axis, a drive and a threaded shank. The shank has at least one turn of a thread formed in it, which turn extends at least partially in a helix of constant pitch along the shank and thus forms a main thread of a changing profile contour that has a mean thread radius along its length. The profile contour is defined by the cross-section of the thread in a sectional plane of the helix, with the screw center axis being located in the sectional plane. The thread radius is the maximum orthogonal distance from the screw center axis to the profile contour of the thread turn. The main thread has a bearing area and a forming area, with the forming area having a forming profile contour of a forming area radius and the bearing area having a bearing profile contour of a bearing area radius.

The forming profile contour is obtained by projecting the thread turn along the helix, particularly in the direction of the drive, over an axially extending region of a length of three times the mean thread radius starting from the free end of the shank, onto a sectional plane of the helix, with the screw center axis M lying in the sectional plane. The projection thus corresponds to the projection of the linear unfolding of the thread turn onto a sectional plane of the helix in which the screw center axis lies. This results in a forming profile contour of a maximum extent that represents the effective forming profile contour. This forming profile contour has a maximum orthogonal distance from the screw center axis, which defines the forming area radius.

The forming area ends at the point of the helix where the forming profile contour has its maximum extent nearest to the drive in the range of 85% of the mean thread radius outwardly in a radial direction before the subsequent profile contours are again within the forming profile contour.

The bearing profile contour is formed by the projection of the thread onto a sectional plane of the helix along the helix, in particular in the direction of the drive, over an axially extending region that starts at a distance of ⅔ of the mean thread radius from the end of the forming area and ends at ⅝ of the mean thread radius. This region forms at least a partial area of the bearing area. It can extend further along the main thread in the direction of the drive as long as the profile contour does not project beyond the bearing profile contour. This bearing profile contour has a maximum orthogonal distance to the screw center axis, which defines the bearing area radius.

This ensures that the transition area from the forming area to the bearing area is as short as possible and that the bearing area is sufficiently long so that a basic holding function of the screw is achieved.

Furthermore, the bearing profile contour and the forming profile contour are matched to one another in such a way that in the case of an overlap of the bearing profile contour and the forming profile contour along the helix, at least in the region that extends outwards in the radial direction from 85% of the radius of the forming area, the bearing profile contour lies completely within the forming profile contour.

This ensures that material springback in the formed female thread can be taken into account and that a low insertion torque can be realized.

The invention provides for the contour of the forming profile to delimit a forming profile surface which—measured in a range of 10% of the radius of the forming area starting from the maximum orthogonal distance of the forming profile contour to the screw center axis radially inwards, is larger than a bearing profile surface delimited by the bearing profile contour, measured in a range of 10% of the radius of the forming area starting from the maximum orthogonal distance of the bearing profile contour to the screw center axis radially inwards.

This matching of profile contours according to the invention allows for a compensation of the springback in the female thread even with relatively small flank angles, ensuring sufficient flank coverage. This prevents damage to the component material, as is caused by a screw having a proportionally enlarged forming area thread.

Preferably, the forming profile contour and the bearing profile contour have a flank angle of less than 35°. The flank angle of the forming profile contour is 180° minus the sum of the two base angles of a trapezoid formed in that the trapezoid bases are constituted by the section lines parallel to the screw axis at 85% of the forming profile radius $R_F$ and at 95% of the forming profile radius $R_F$. Base angles are the angles at the longer trapezoid base, i.e. at the section line at 85%.

Similarly, the same rule used for the determination of the flank angle also applies for the bearing profile contour, in which case the section lines are placed at 85% of the bearing profile radius $R_T$ and at 95% of the bearing profile radius $R_T$.

The flank angle is in particular between 20° and 30°. This angle has proven useful for screwing together plastic components.

According to an advantageous further development of the invention, the radius of the bearing area is smaller by between 1% and 3% than the radius of the forming area. This keeps damage to the material of the plastic component down to a minimum, but still allows a sufficiently large distance to be set between the forming profile contour and the bearing profile contour, which represents the material springback.

It is particularly advantageous for the bearing profile contour to have an axial width at 95% of the bearing area radius that is smaller than the axial width of the forming profile contour at 95% of the forming area radius. This allows a simple design of the thread profile in such a manner that the forming profile surface is larger than the bearing profile surface.

In particular, the width of the bearing profile contour is smaller by at least 10%, in particular by at least 20%, than the width of the forming profile contour.

To facilitate production, the forming profile contour and/or the bearing profile contour can be symmetrical.

According to a particularly advantageous embodiment, the forming area is smaller than 2 times the pitch. Preferably, the thread turn increases up to its forming profile contour and then remains constant over a region extending up to the end of the forming area.

Preferably, the ratio of core radius to mean thread radius can be between 0.6 and 0.8. These are common ratios for plastic screws.

Furthermore, in another embodiment of the invention, the bearing profile contour, in the region that extends radially within 85% of the radius of the forming region, can lie at least partially outside the forming profile contour. This provides for greater flexibility in the design of the flank transition to the thread root, thus allowing better account to be taken of the material properties.

Furthermore, the core diameter in the forming area is preferably less than or equal to the core diameter in the bearing area.

According to another advantageous embodiment of the invention, the shank may have a tap flute at the free end of the screw shank, which tap flute comprises at least two tapping thread turns which are of a radius that is at most 90% of the radius of the forming area and which form a tap region.

The tap flute region is formed where the tapping thread turns have the same diameter course and where, moreover, the thread radius of the main thread is less than or equal to the thread radius of the tapping thread turns.

This is advantageous in that it enables the screw to be placed in particularly straight orientation, which means that the female thread made into the plastic component by the subsequent forming region and the thread of the bearing area following the forming area are aligned as precisely as possible, with the result that precise account can be taken of the springback of the plastic material. As a result, friction occurring in the bearing area as the screw is being inserted can be reduced further or even prevented altogether.

Preferably, the main thread in the tap region has the same thread radius as the tap flute at the same axial distance from the free end of the screw shank. In this way, at least three identical tapping points are created by the, in particular two, tapping thread turns and the main thread, which ensures a particularly straight orientation of the screw for tapping.

Preferably, all thread turns in the tap region area have their beginning in the same cross-sectional plane. Furthermore, all thread turns in the tap region have the same cross-sectional contour. This means that they are identical in design. For example, the main thread and the two tapping thread turns start in the same way and have the same thread course.

As an alternative, at least three tapping thread turns can also be provided, in which case the thread radius of the main thread in the tap region is in particular smaller than the radius of the tap flute.

According to an advantageous embodiment of the invention, the tapping thread turns start at the core, with the radius of the tapping thread turns increasing continuously from the core to the end of the tap region. This ensures continuous and uniform orientation of the screw for tapping.

Furthermore, the thread turns having the same thread radius can be equally distributed around the circumference at the same axial height in the tap region. This ensures symmetrical engagement with the pilot hole in the plastic component.

In particular, the diameter of the free end of the screw is at least 20%, at least 30%, at least 40%, at least 50%, at least 60% of twice the radius of the forming area. Such a blunt tip is common for plastic screws.

The tap flute can immediately follow the free end of the screw. This ensures ideal guidance of the screw as the latter is initially applied for tapping.

Alternatively, the tap flute can start at a distance from the free end of the screw. In this way, the region extending towards the end of the screw can have a locating function.

To facilitate production, the tap flute and the main thread can be rolled threads.

According to yet another advantageous embodiment of the invention, the threads in the tap region may have a more obtuse flank angle than the main thread outside the tap region. This is advantageous in that it provides good centering of the screw without the tapping thread turns tapping into the material unilaterally, and it also facilitates repeat assembly operations.

The tapping thread turns can run out abruptly at the end of the tap region. This has the advantage that it minimizes friction as the screw is screwed further into a narrow pilot hole.

According to yet another advantageous embodiment of the invention, the tap flute may extend over a maximum of two turns. This makes for an efficient screw connection, while still ensuring an optimal orientation of the screw.

In one thread turn there can be thread turn interruptions, with the interpolated course of the thread radius remaining the same, however.

According to another aspect, the invention relates to a method for producing a screw connection comprising a screw according to the invention, of the type described above. For this purpose, the screw according to the invention is screwed into a pilot hole made in a plastic component, with its forming area thus making a counter thread or a female thread having the forming profile contour into the plastic. As soon as the counter thread is no longer in engagement with the forming area, it will spring back in the bearing area so as to reliably prevent the female thread from contacting the thread in the bearing area as the screw is being inserted. The thread in the bearing area will only be pressed against the counter thread when the screw is finally tightened in the component.

Preferably, the screw according to the invention is screwed into a pilot hole having a radius of approximately 80% of the radius of the forming area.

Furthermore, the invention relates to a screw connection produced according to the method described above.

Additional advantages, features and possible applications of the present invention may be gathered from the description which follows in which reference is made to the embodiments illustrated in the drawings.

BRIEF DESCRIPTION OF THE DRAWINGS

In the drawings,

FIG. 5a is a perspective view of the unfolded thread turn in the bearing area;

FIG. 5b is a front view of the unfolded thread turn;

FIG. 5c is a view of a bearing thread contour obtained through projection;

FIG. 8a is a view of the forming profile surface;

FIG. 8b is a view of the bearing profile surface;

FIG. 9 is a view illustrating the forming profile flank angle;

DESCRIPTION OF THE INVENTION

Figure 1:
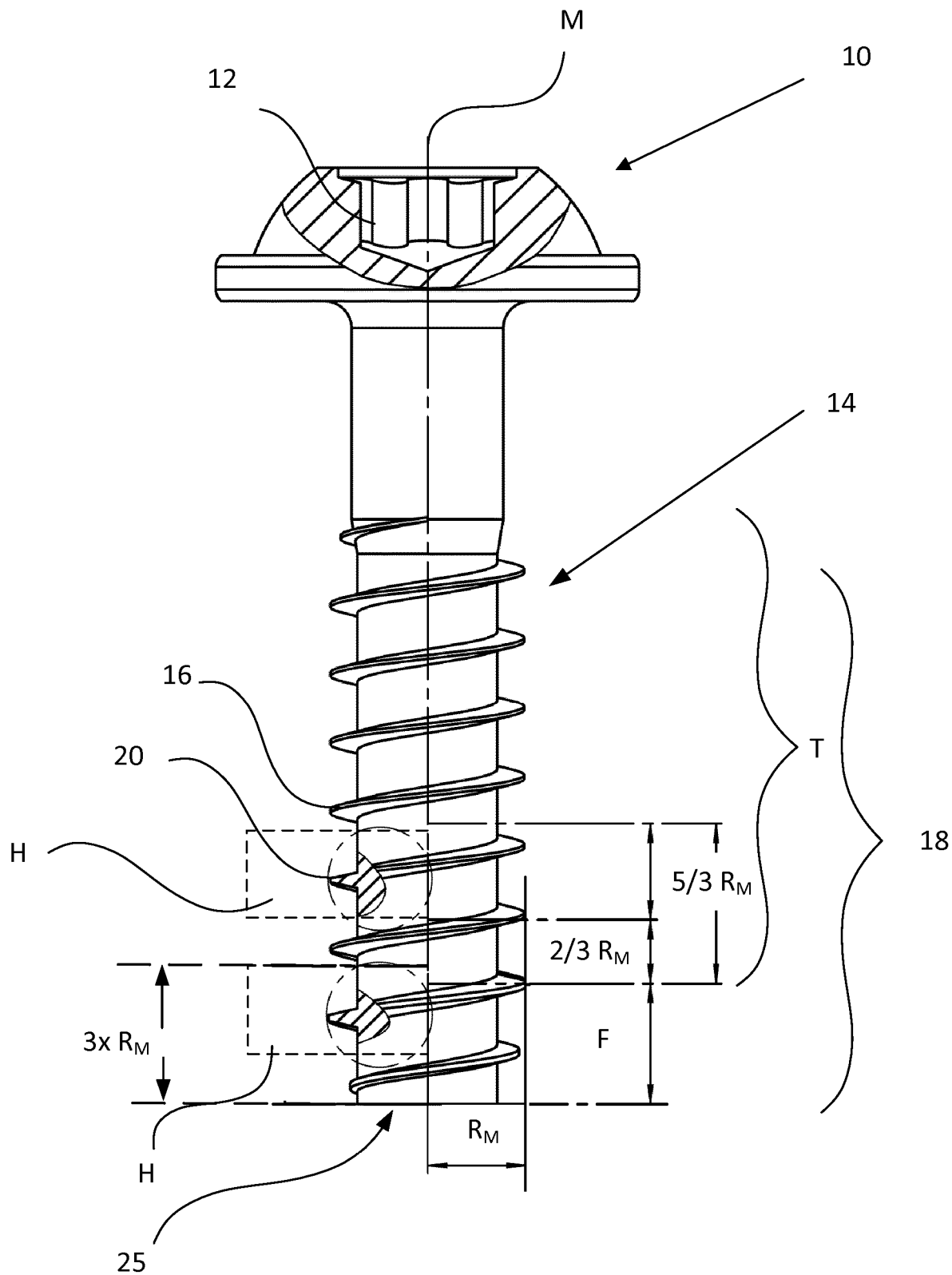
FIG. 1 is a lateral view of a screw according to the invention.

FIG. 1 is a lateral view of a screw 10 according to the invention, comprising a screw center axis M, a drive 12 and a threaded shank 14. Hereinafter, the direction along the screw center axis M shall be referred to as the axial direction. The shank 14 has at least one thread 16 formed thereon which extends in a helix of constant pitch along the shank, thus forming a main thread 18 having a changing profile contour 20. Along its length, the main thread 18 has a mean thread radius $R_M$. The mean thread radius $R_M$ is the average thread radius over the main thread 18 and will generally be between the forming area radius and the bearing area radius. The mean thread radius $R_M$ will therefore approximate the nominal radius.

The profile contour 20 is formed by the section through the thread turn in a sectional plane H of the helix in which the screw center axis M lies.

The thread radius R is defined as the maximum orthogonal distance from the screw center axis M to the profile contour 20 of thread turn 16. This will be explained in more detail with reference to FIG. 3a.

The main thread 18 has a bearing area T and a forming area F, resulting in a forming profile contour 24 having a forming area radius $R_F$ in the forming area and a bearing profile contour 22 having a bearing area radius $R_T$ in the bearing area T.

The forming profile contour 24 is defined by the projection of the thread turn 16 along the helix over an axially extending area that is three times the length of the mean thread radius (3 times $R_M$) starting from the free end of the shank 25 onto a sectional plane of the helix H. It will be described in more detail with reference to FIG. 3c.

This projection thus corresponds to the projection of the linear unfolded thread turn onto the sectional plane H of the helix in which the screw center axis M lies.

Figure 2:
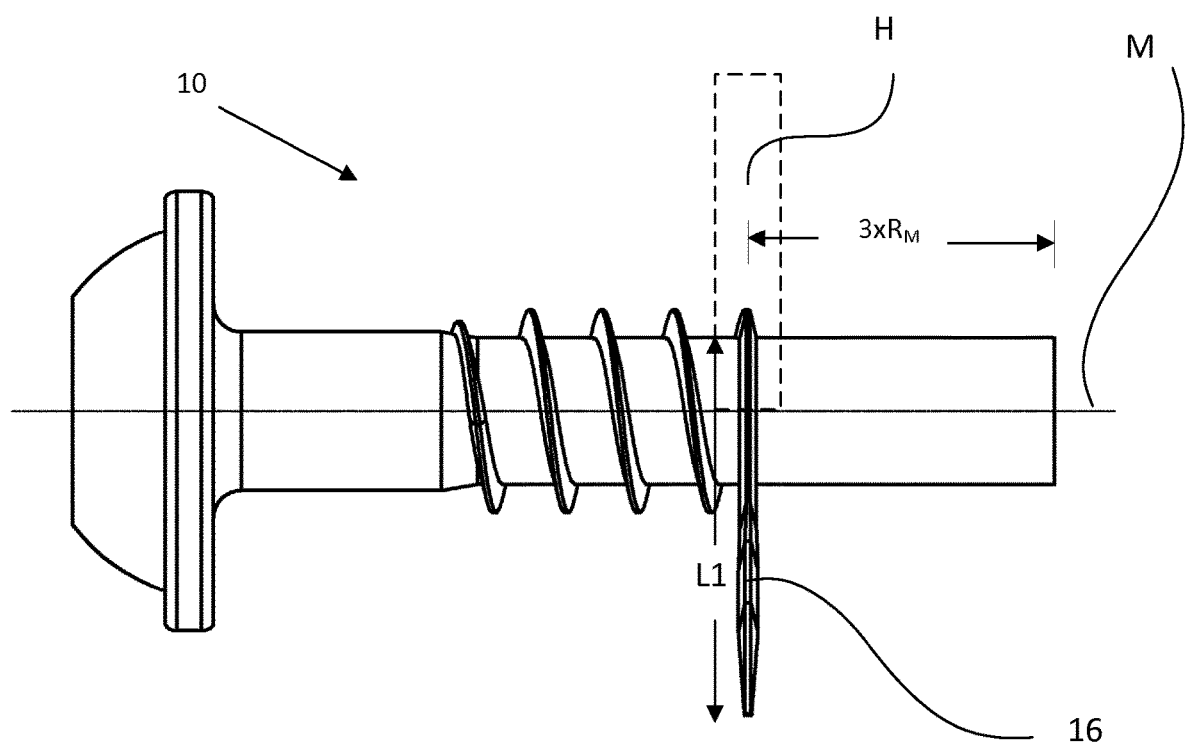
FIG. 2 is a perspective view of the unfolded state of the thread turn.

FIG. 2 is a lateral view of the screw 10 and its screw center axis M. The axial area of screw 10 from the beginning of the thread turn 16 extends over an axial length of 3 times $R_M$, which thread turn is then unfolded over length L1. Furthermore, this view shows the sectional plane H in which the screw center axis M lies.

Figure 3A:
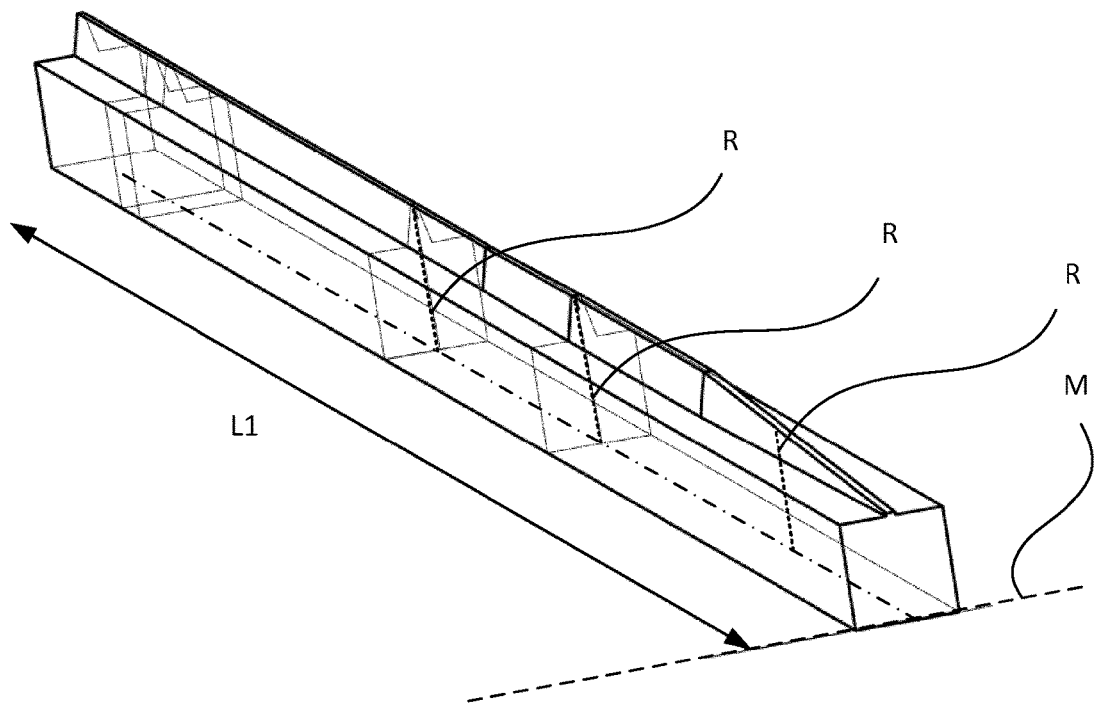
FIG. 3a is a perspective view of the unfolded state of the thread over 3 times $R_M$.

The perspective view of the unfolded state of thread turn 16 is shown in FIG. 3a. The unfolded state view schematically shows the thread turn 16 of a length L1, with L1 corresponding to the length of the thread turn 16 in the unfolded state that results for an axial extent of 3 times $R_M$. Radius R is shown as a dashed line at various points on the thread turn 16. In this way, the mean thread radius is determined over the entire length of the main thread 18.

Figures 3B, 3C:
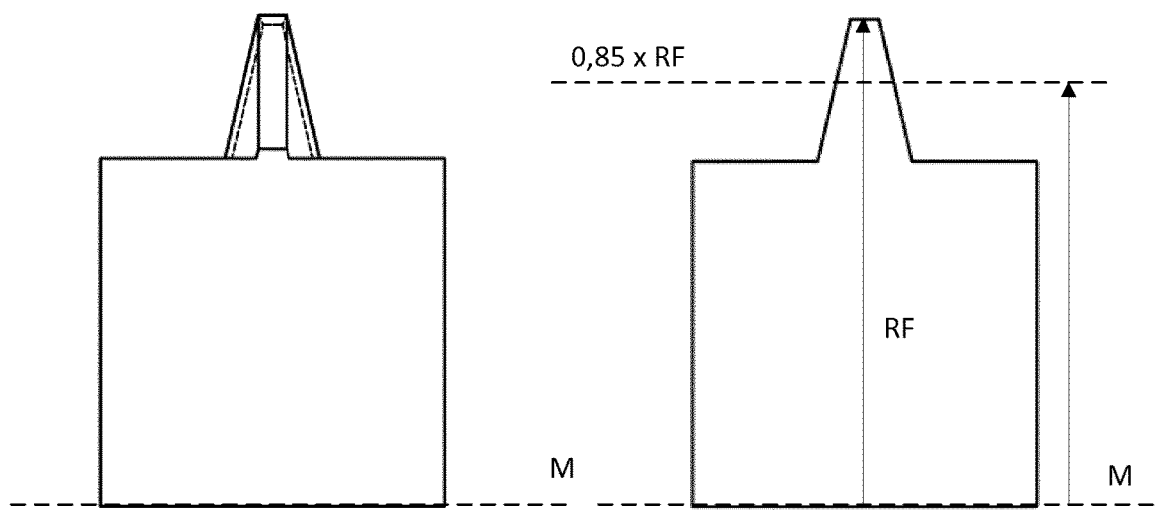
FIG. 3b is a front view of the unfolded state of the thread turn.
FIG. 3c is a view of the forming profile contour obtained from the projection of the unfolded thread turn.

FIG. 3b is the front view of the unfolded state, which corresponds to a sectional plane of the helix. Thus, the projection onto the sectional plane results in the forming profile contour 24 illustrated in FIG. 3c with a maximum extent which represents the effective forming profile contour 24 that will then produce the female thread in the component.

Figure 4:
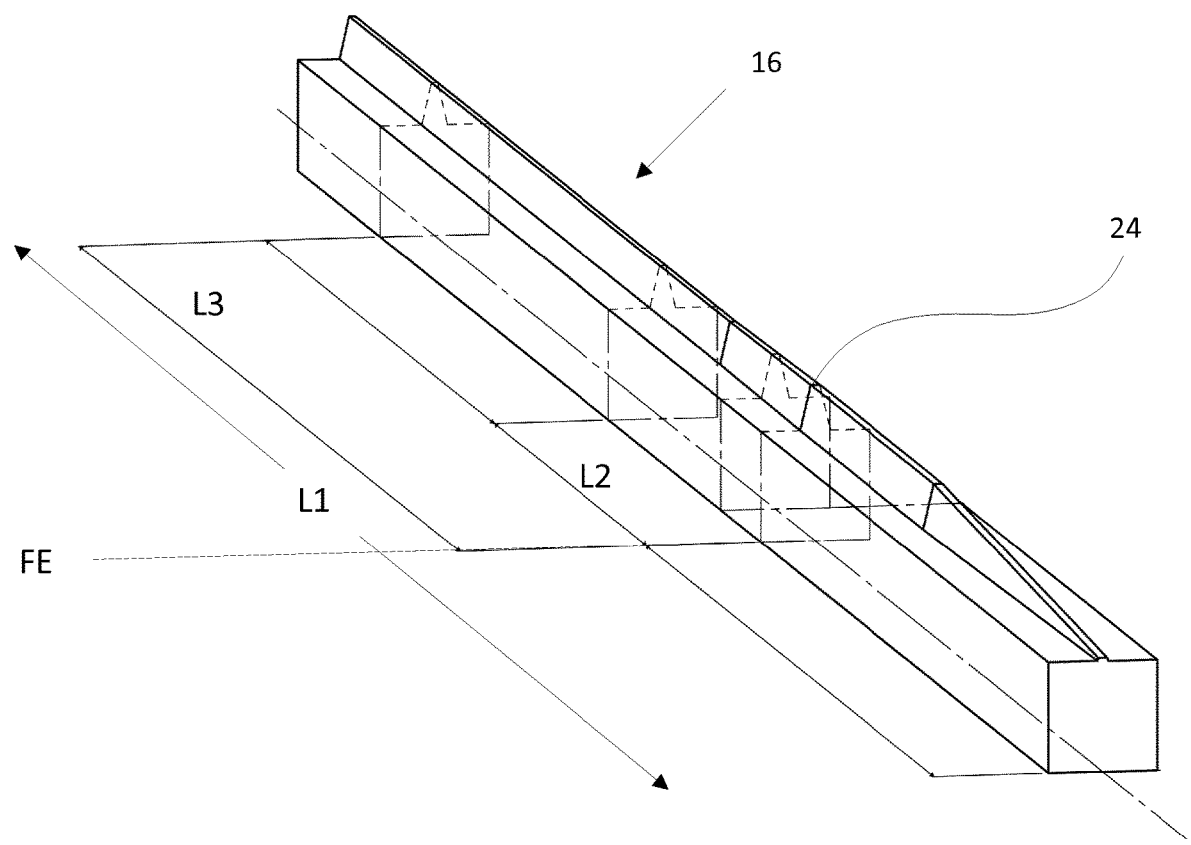
FIG. 4 is a perspective view of the unfolded thread turn showing the end of the forming area.

The forming area F terminates at the forming area end FE, i.e. at the position of the main thread 18 where there is still the maximum extent of the forming profile contour 24 closest to the drive in the range of 85% of the mean thread radius in the radial direction outwards, before the subsequent profile contour in the region up to the end of L1, i.e. the corresponding length of the thread turn relative to the length 3 times $R_M$ in the axial direction, is again within the forming profile contour 24. The position of the forming area end FE is shown in FIG. 4. At the point FE, the forming profile contour 24, starting from the beginning of the thread, is present for the last time before the profile contour merges into the bearing profile contour 22 after a transition area, which bearing profile contour 22 is maintained over the remaining screw length of the main thread 18 in the present example.

The bearing profile contour 22 is formed by the projection of the part of the thread turn 16 onto a sectional plane H of the helix along the helix over an axially extending area that begins at an axial distance of ⅔ of the mean thread radius $R_M$ from the forming area end FE and ends at an axial distance of ⁵⁄₃ of the mean thread radius $R_M$ from the forming area end FE. This region forms at least a partial area of the bearing area T. FIG. 4 is a view illustrating the region in the unfolded state of thread 18 which results in keeping with the specified dimensions in the axial direction. Thus L2 is the length of the thread turn 16 which is obtained by unfolding the axial area of ⅔ times $R_M$. L3 is the length of the thread turn 16 which is obtained by unfolding the axial area of ⅗ times $R_M$.

Having the area for determining the bearing profile contour 22 start at ⅔ times $R_M$ ensures that the transition area from the forming area F to the bearing area T will be as short as possible. As a result, the transition area in the unfolded state is shorter than L2 and is less than or equal to ⅔ times $R_M$ in the axial direction. The bearing area T has a length of at least L3—L2 in the unfolded state, thus ensuring an essential holding function of the screw. The unfolded state of the part of the thread 16 that at least partially forms the bearing area is shown in FIG. 5a. FIG. 5b is a front view of the unfolded state and FIG. 5c is the corresponding projection of the unfolded state onto the sectional plane H of the helix that defines the bearing profile contour 22. The front view and the projection are identical in the present case since the profile contour in the bearing area in the present case corresponds to the bearing profile contour 22.

Figure 6:
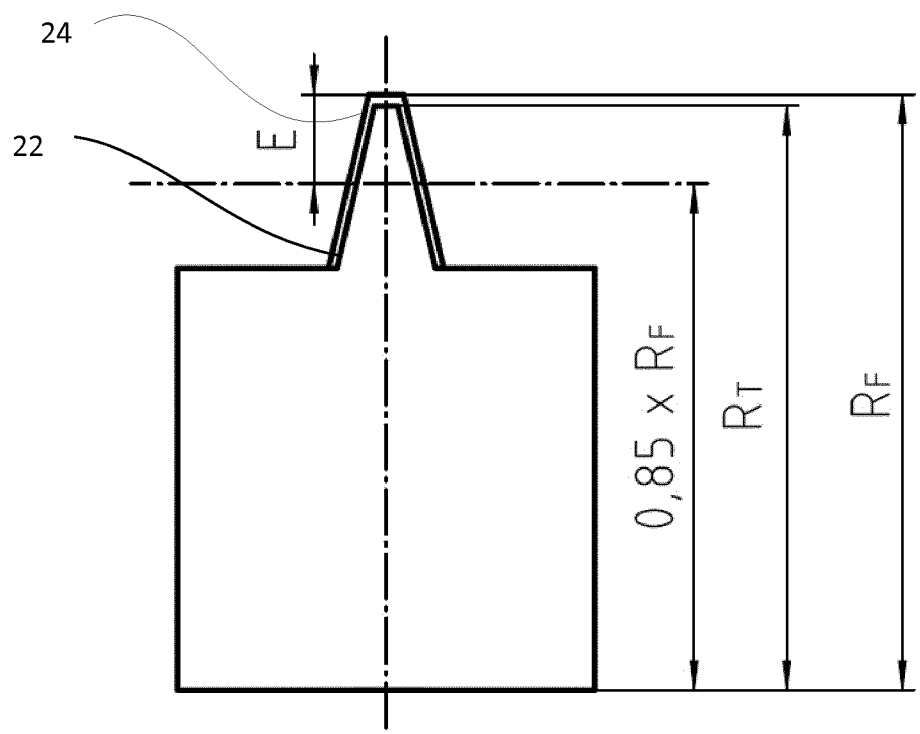
FIG. 6 is a view of the overlap of the forming thread contour of FIG. 3c and the bearing thread contour of FIG. 5c.
Figure 7:
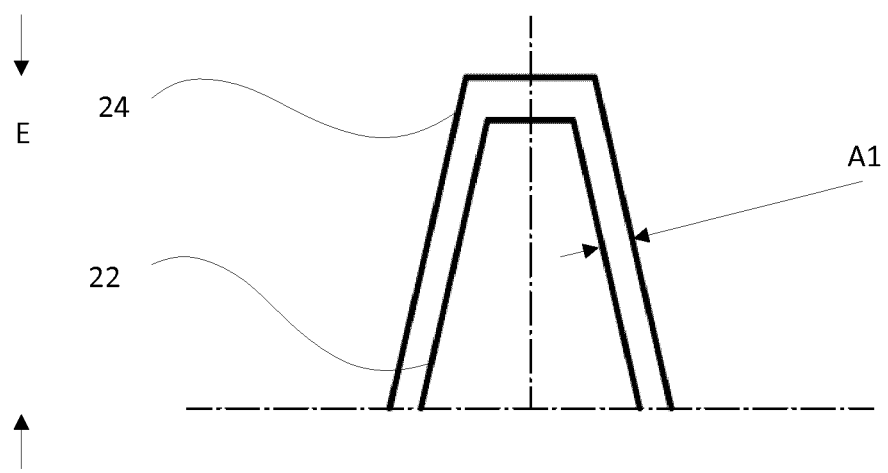
FIG. 7 is an enlarged view of the overlap illustrated in FIG. 6.

As is seen in FIG. 6, the bearing profile contour 22 and the forming profile contour 24 are matched to one another in such a way that in case of an overlap of the bearing profile contour 22 and the forming profile contour 24, at least in the region E that extends outwards in the radial direction from 85% of the forming area radius $R_F$, the bearing profile contour 22 will be completely within the forming profile contour 24. An enlarged view of region E is seen in FIG. 7. While the distance A1 between the flanks of the forming profile contour 24 and the bearing profile contour 22 may be chosen according to the elasticity of the material, it is preferably between 0.03 mm and 0.05 mm, in particular 0.04 mm, for a screw of a nominal diameter of 5 mm. This distance preferably remains constant over the entire flank, at least in region E.

FIG. 8a is an enlarged view of region E of the forming profile contour 24, which delimits a forming profile surface 26 that is formed radially inwards measured in a range of 10% of the forming area radius starting from the maximum orthogonal distance of the forming profile contour to the center axis of the screw. FIG. 8b is an enlarged view of region E of the bearing profile contour 22, with the bearing profile contour 22 defining a bearing profile surface 28 that is measured radially inwardly in a range of 10% of the forming area radius $R_F$ starting from the maximum orthogonal distance, which corresponds to $R_T$, of the bearing profile contour from the center axis of the screw.

According to the invention, the forming profile surface 26 is larger than the bearing profile surface 28, which has the advantage that even acute flank angles can be realized without excessive stress on the material into which the screw is inserted, thus achieving a high pull-out force at a low insertion torque.

The flank angle alpha of the forming profile contour 24 is determined as illustrated in the view of FIG. 9. This angle corresponds to 180° minus the sum of the base angles (beta1, beta2) of a trapezoid formed in that the trapezoid bases are constituted by the section lines parallel to the screw axis at 85% of the forming profile radius $R_F$ and at 95% of the forming profile radius $R_F$. Base angles are the angles at the longer trapezoid base, i.e. at the section line at 85%.

The flank angle is less than 35°, and in particular is between 20° and 30°.

The same rule for the determination of the flank angle also applies to the bearing profile contour 22, with the section lines being set at 85% and at 95% of the bearing profile radius $R_T$.

Figure 10:
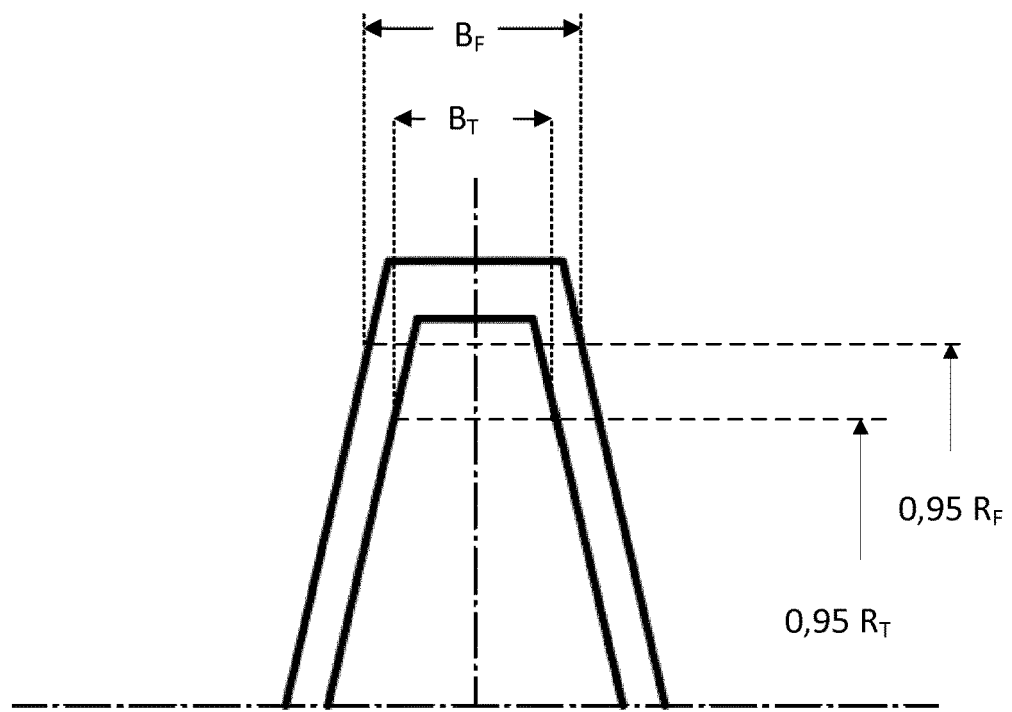
FIG. 10 is a view of the overlap of a forming profile contour and a bearing profile contour.

FIG. 10 is a comparative view of the width $B_F$ of the forming profile contour at 95% of the forming radius and of the width of the bearing profile contour $B_T$. In this case, the width $B_F$ of the forming profile contour 24 is larger than the width $B_T$ of the bearing profile contour 22. In the example illustrated in FIG. 10, the width $B_T$ of the bearing profile contour 22 is approximately 10% smaller than the width $B_F$ of the forming profile contour 24. In the present example, the forming profile contour 24 and the bearing profile contour 22 are symmetrical. The axis of symmetry is the orthogonal to the screw center axis M which intersects the profile contour 22, 24 in half the width $B_T$ and/or $B_F$, resp.

Figure 11:
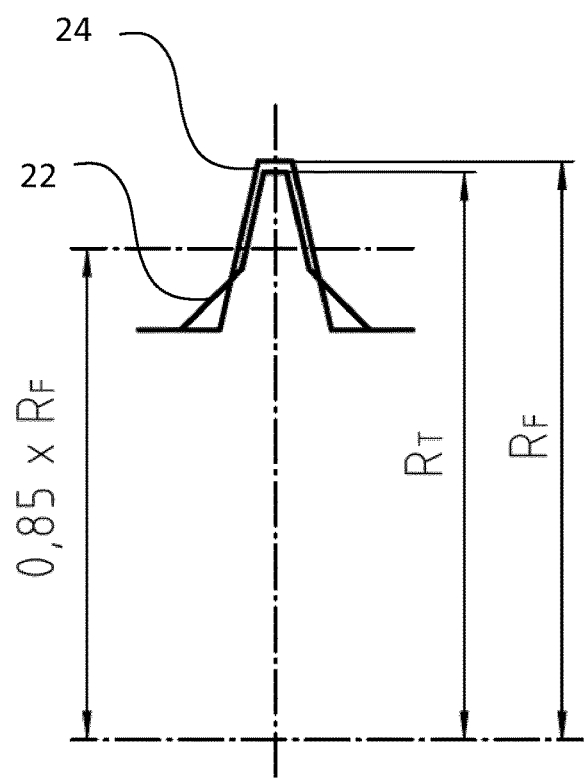
FIG. 11 is a view of the overlap of a forming profile contour and a bearing profile contour.

FIG. 11 is a view of another embodiment of the thread in the bearing area T, in which case the transition from the thread flank to the thread root is flatter than in the view of the foregoing drawing figures. As a result, in the region radially within 85% of the forming area radius, the bearing profile contour 22 is at least partially outside the forming area contour 24.

Figure 12:
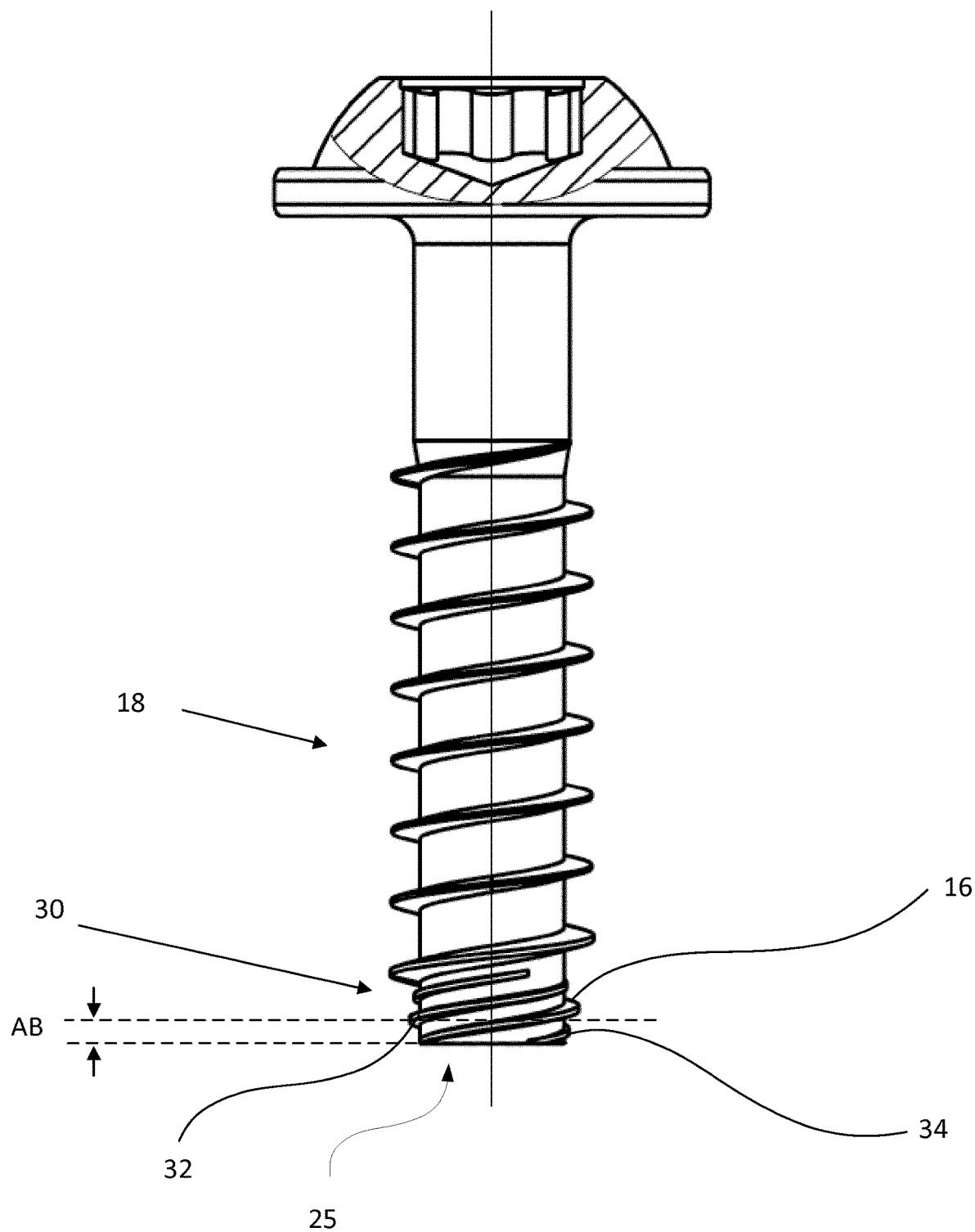
FIG. 12 is a lateral view of a screw having a tap flute according to the invention.

FIG. 12 is a view of yet another embodiment of a screw according to the invention, the shank of which additionally has a tap flute 30 at the free end of the screw shank. The tap flute comprises at least two tapping thread turns 32, 34 of a radius that reaches at most 90% of the radius of the forming area $R_F$ and which form a tap region AB in which the tapping thread turns 32, 34 have the same radius course over their associated helix and in which furthermore the thread radius of the main thread is less than or equal to the thread radius of the tapping thread turns at the same axial distance from the free end 25 of the screw.

In this embodiment, the thread turn 16 of the main thread 18 in the tap region has the same thread radius R as the tap flute 30, with the same axial distance from the free end of the screw. The tapping thread turns 32, 34 start directly at the free end 25 of the screw shank on the core. This ensures that the screw will be ideally guided from the moment it is initially placed for tapping. In this embodiment, the tap flute 30 extends over approximately one turn, with the tap region terminating at approximately one third of a turn.

In this embodiment, the diameter of the free end of the screw shank corresponds to at least 65% of twice the radius of the forming area $R_F$.

The tap region will now be described in more detail with reference to FIGS. 13a to 13d.

Figure 13A:
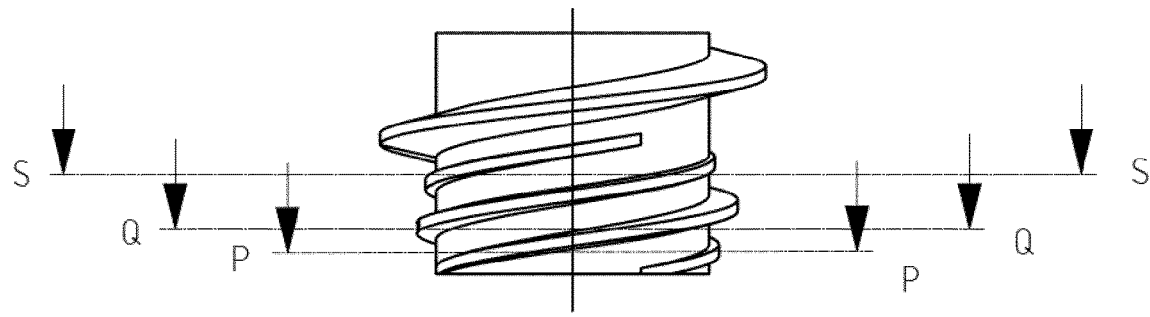
FIG. 13a is an enlarged view of the tap region illustrated in FIG. 12.
Figures 13B, 13C:
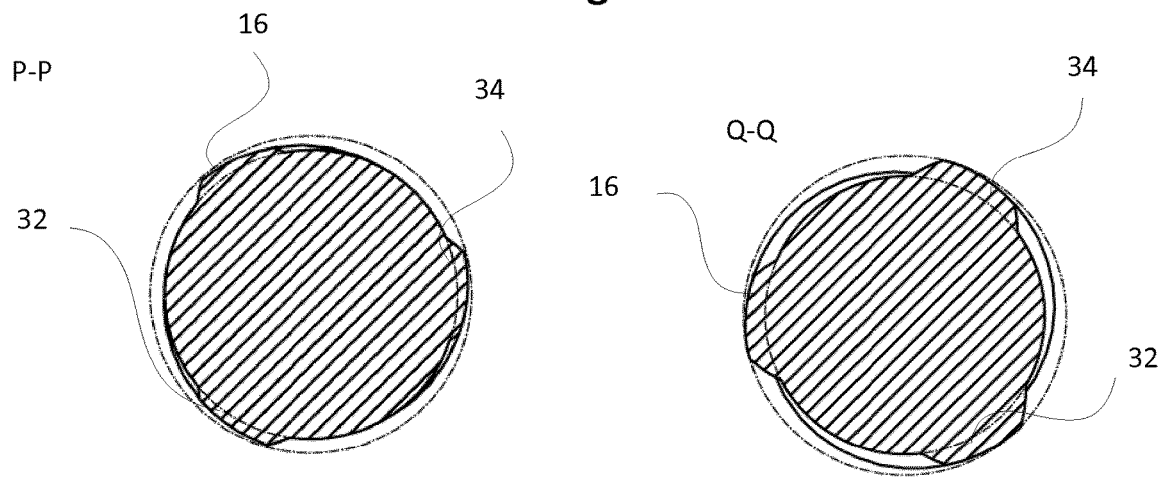
FIG. 13b is a cross-sectional view through the tap region.
FIG. 13c is another cross-sectional view through the tap region.

FIG. 13a is an enlarged lateral view of the free end 25 of the screw shank with three cross-sectional lines. The first cross-sectional line P-P is located in the center of the tap region AB. Cross-sectional line Q-Q is located at the end of the tap region AB, and cross-sectional line S-S is located above the tap region. FIG. 13b is a view of a cross-section taken along cross-sectional line P-P. As is clearly seen in FIG. 13b, the threads in the tap region, i.e. the two tapping thread turns 32, 34 and the thread turn 16, all have the same thread radius. The same is true for the end of the tap region as seen in FIG. 13c, in which the threads 16, 32, 34 still all have the same thread radius R at the same axial distance from the free end of the screw axis.

Figure 13D:
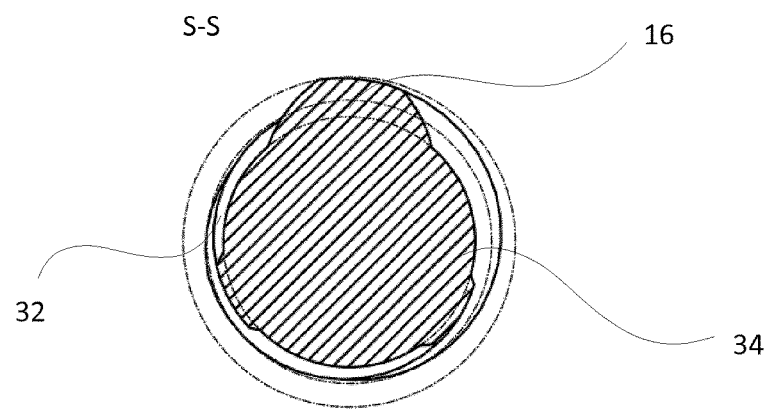
FIG. 13d is a cross-sectional view through the screw shank outside the tap region.

FIG. 13d finally is a view of a cross-section taken along cross-sectional line S-S and clearly illustrates the thread radii of the two tapping thread turns 32, 34 and the thread turn 16 of the main thread outside of the tap region AB. In this region, the thread radii R of the tapping thread turns 32, 34 are significantly smaller than the thread radius of thread turn 16 of the main thread 18 at this cross-sectional line. In this embodiment, the tap flutes run out gently after the tap region, whereas the main thread turn continues to increase until it reaches its forming profile contour.

Figure 14:
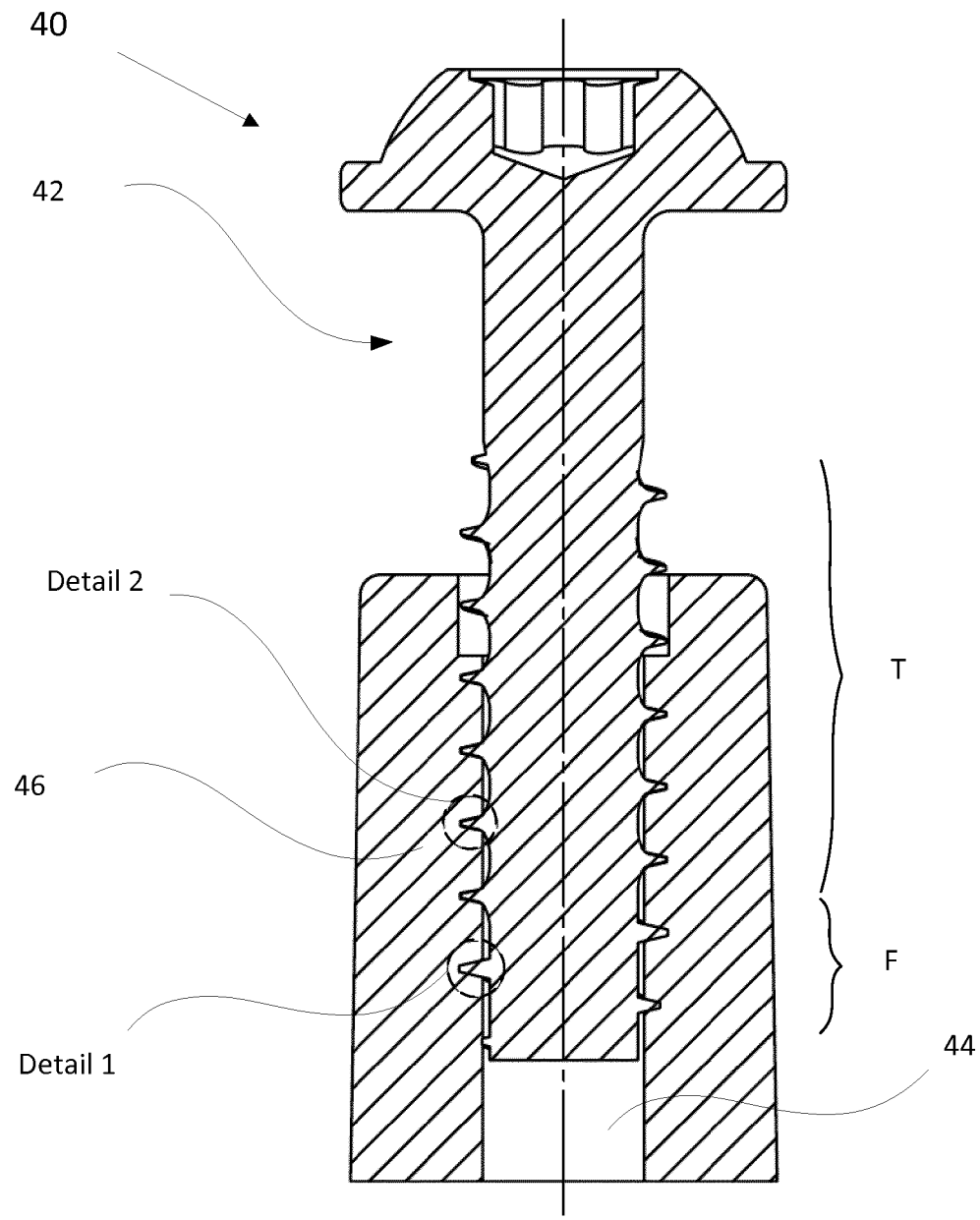
FIG. 14 is a sectional view of a screw connection according to the invention.

FIG. 14 is a sectional view illustrating the making of a screw connection 40.

Figure 15A:
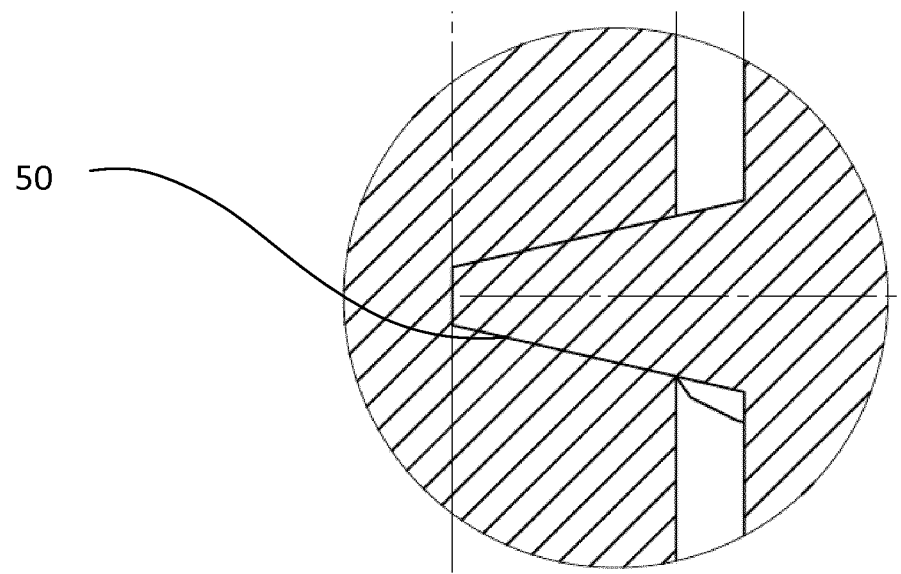
FIG. 15a is an enlarged view of the forming thread area illustrated in FIG. 14.

The screw connection 40 comprises a screw 42 and a plastic component 46 with a pilot hole 44 made in it. The front forming area F of the screw 42 is used to preform a thread turn into the plastic component 46, which thread turn is then engaged by the subsequent bearing area T of the thread turn. FIG. 15a is an enlarged view of detail 1 illustrating the engagement of the thread in the forming area F and of detail 2 illustrating the engagement of the thread in the bearing area of the main thread.

Figure 15B:
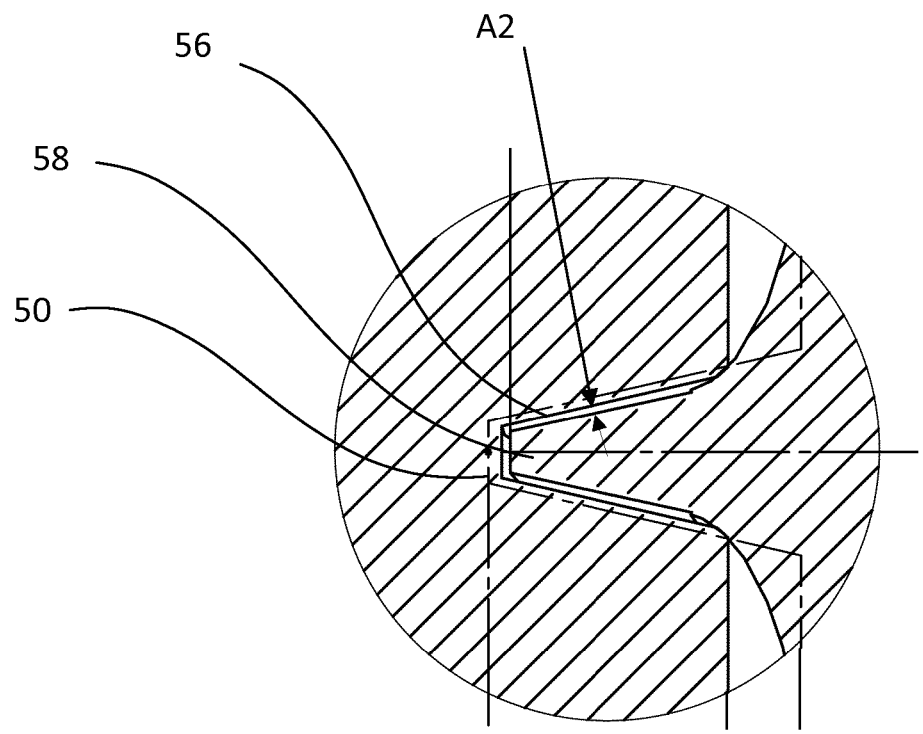
FIG. 15b is an enlarged view of the bearing thread area illustrated in FIG. 14.

The forming profile contour 50 is shown in FIG. 15a. The subsequent thread with the bearing profile contour 58 in the bearing area of the screw is shown in the enlarged detail view of FIG. 15b. The detail view of FIG. 15b shows the thread turn in the female thread in its spring-back state with contour line 56. Despite the springback of the female thread, the thread flanks of the bearing profile contour 58 are still spaced a distance A2 from the spring-back female thread. This allows the thread of the bearing profile contour to be screwed into the female thread almost without friction. Only the final tightening of the screw 42 will cause the thread in the bearing area to be pressed against the flank of the female thread, thus creating a frictional connection in the direction of rotation. By making the surface of the tip region of the bearing profile contour 58 smaller than the surface of the forming profile contour 50, both a low insertion torque and a high pull-out strength can be guaranteed, because this prevents material damage to the plastic material, while still ensuring sufficient spacing of the thread flanks between the spring-back female thread and the thread in the bearing area.

The invention claimed is:

1. A screw (10) having a screw center axis (M), comprising:
   a drive (12) and a threaded shank (14);
   said threaded shank (14) has a thread turn (16) which partially extends along said shank in a helix of constant pitch and which forms a main thread (18) that has a thread radius (R) and a mean thread radius (RM) over its length;
   said threaded shank (14) being insertable in a plastic component (46);
   said thread radius (R) being the maximum orthogonal distance from said screw axis (M) to a profile contour of said thread turn;
   said main thread (18) has a bearing area (T) and a forming area (F);
   a forming profile contour (24) having a forming area radius ($R_F$);
   a bearing profile contour (22) having a bearing area radius ($R_T$);
   said forming area (F) terminating at an end point defining a forming area end (FE) of said shank;
   said main thread (18) comprises said forming profile contour (24) in said forming area (F);
   said forming area extends over an axial length of three times said mean thread radius ($R_M$) starting from a free end (25) of said shank to said forming area end, said forming area comprising said forming profile contour at said forming area end;
   said main thread (18) comprises said bearing area and said bearing profile contour (22) that extends axially over a length of said threaded shank starting at a distance of ⅔ times said mean thread radius (RM) from said forming area end (FE);
   said bearing profile contour (22) is smaller than said forming profile contour (24) at least in a region which extends radially outwards from 85% of said forming area radius ($R_F$);
   when superimposed, said bearing profile contour (22) lies completely within said forming profile contour (24);
   a forming profile surface (26) which is delimited by said forming profile contour (24) and is measured in a range of 10% of said forming area radius ($R_F$) starting from said maximum orthogonal distance of said forming profile contour (24) to said screw center axis (M), is larger than a bearing profile surface (28) which is delimited by said bearing profile contour (22) and is measured in a range of 10% of said forming area radius ($R_F$) starting from said maximum orthogonal distance of said bearing profile contour to said screw center axis (M).

2. The screw according to claim 1, further comprising:
   said forming profile contour has a flank angle and said flank angle is less than 35°;
   and, said bearing profile contour has a flank angle less than 35°.

3. The screw according to claim 1, characterized in that said bearing area radius ($R_T$) is smaller by between 1% and 3% than said forming area radius ($R_F$).

4. The screw according to claim 1, characterized in that said forming profile contour (24) and/or said bearing profile contour (22) is/are symmetrical.

5. The screw according to claim 1, characterized in that:
   said bearing profile contour has a width ($B_T$) at 95% of the bearing radius ($R_T$);
   said forming profile contour has a width ($B_F$) at 95% of said forming radius ($R_F$);
   said width ($B_T$) is smaller than said width ($B_F$).

6. The screw according to claim 5, characterized in that said width ($B_T$) of said bearing profile contour (22) is at least 10% smaller than said width ($B_F$) of the forming profile contour (24).

7. The screw according to claim 1, characterized in that said shank has a tap flute (30) in a region of said free end (25) of said screw shank, said tap flute (30) comprises at least two tapping thread turns (32, 34) which have a radius that reaches at most 90% of the radius ($R_F$) of said forming region and which form a tap region (AB) and, in said tap region (AB) said thread radius of said main thread (18) is less than or equal to said thread radius of said tapping thread turns (32, 34).

8. The screw according to claim 7, characterized in that said main thread (18) in said tap region (AB) has the same thread radius (R) as the tap flute (32, 34).

9. The screw according to claim 7, characterized in that at least three tapping thread turns (32, 34) are provided, with said thread radius (R) of said main thread (18) in said tap region (AB) being less than that of the tap flute.

10. The screw according to claim 7, further comprising a core, and characterized in that said tapping thread turns (32, 34) start at said core, with their thread radius (R) continuously increasing in the direction of said bearing area (T).

11. The screw according to claim 7, characterized in that said thread turns (16, 32, 34) of the same thread radius (R) are equally distributed circumferentially in the tap region (AB).

12. The screw according to claim 7, further comprising a core, said core having a core diameter, said screw has said free end (25), said core diameter at said free end is at least 20% of said forming area radius.

13. The screw according to claim 7, characterized in that said thread turns (16, 32, 34) in said tap region (AB) all begin at said free end of said shank have their beginning in the same place.

14. The screw according to claim 7, characterized in that said thread turns (16, 32, 34) in said tap region (AB) all have the same profile contour.

15. The screw according to claim 7, characterized in that said tap flute (30) directly adjoins said free shank end (25).

16. The screw according to claim 7, characterized in that said tap flute (30) begins at a distance from the free shank end (25).

17. The screw according to claim 7, characterized in that said tap flute (30) and said main thread (18) are rolled threads.

18. The screw according to claim 7, characterized in that said threads in said tap region (AB) have a greater flank angle than said main thread (18) outside said tap region (AB).

19. The screw according to claim 7, characterized in that said tap flute (30) runs out abruptly.

20. The screw according to the claim 7, characterized in that said tap flute (30) extends over a maximum of two turns.

21. A screw (10) having a screw center axis (M), comprising:
   a drive (12) and a threaded shank (14);
   said threaded shank (14) has a thread turn (16) which partially extends along said shank in a helix of constant pitch and which forms a main thread (18) that has a thread radius (R) and a mean thread radius ($R_M$) over its length;
   said threaded shank (14) being insertable in a plastic component (46);
   said thread radius (R) being the maximum orthogonal distance from said screw axis (M) to a profile contour of said thread turn;
   said main thread (18) has a bearing area (T), a transitional area, and a forming area (F);
   a forming profile contour (24) having a forming area radius ($R_F$);
   a bearing profile contour (22) having a bearing area radius ($R_T$);
   said forming area radius ($R_F$) is greater than said bearing area radius ($R_T$);
   said forming area (F) terminating at an end point defining a forming area end (FE) of said shank;
   said main thread (18) comprises said forming profile contour (24) in said forming area (F);
   said forming area extends over an axial length three times the said mean thread radius ($R_M$) starting from a free end (25) of said shank to said forming area end (FE), said forming area comprising said forming profile contour at said forming area end;
   said main thread (18) comprises said bearing area and said bearing profile contour (22) that extends axially over a length of said threaded shank starting at a distance of ⅔ times said mean thread radius (RM) from said forming area end (FE);
   said main thread (18) in said transitional area beginning at said forming area end (FE) of said shank and continuing a maximum length of ⅔ RM to said start of said bearing profile contour (22);
   said bearing profile contour (22) is smaller than said forming profile contour (24) at least in a region which extends radially outwards from 85% of the forming area radius ($R_F$);
   when superimposed, said bearing profile contour (22) lies completely within said forming profile contour (24);
   said bearing profile contour (22) and said forming profile contour (24) are positioned for spring back of said plastic component (46) when said screw is inserted in said component (46);
   a forming profile surface (26) which is delimited by said forming profile contour (24) and is measured in a range of 10% of said forming area radius ($R_F$) starting from said maximum orthogonal distance of said forming profile contour (24) to said screw center axis, is larger than a bearing profile surface (28) which is delimited by said bearing profile contour (22) and is measured in a range of 10% of said forming area radius ($R_F$) starting from said maximum orthogonal distance of said bearing profile contour to said screw center axis.

22. A screw (10) having a screw center axis (M), comprising:
   a drive (12) and a threaded shank (14);
   said threaded shank (14) has a thread turn (16) which partially extends along said shank in a helix of constant pitch and which forms a main thread (18) that has a thread radius (R) and a mean thread radius ($R_M$) over its length;
   said threaded shank (14) being insertable in a plastic component (46);
   said thread radius (R) being the maximum orthogonal distance from said screw axis (M) to a profile contour of said thread turn;
   said main thread (18) has a bearing area (T) and a forming area (F);
   a forming profile contour (24) having a forming area radius ($R_F$);
   a bearing profile contour (22) having a bearing area radius ($R_T$);
   said forming area (F) terminating at an end point defining a forming area end (FE) of said shank;
   said main thread (18) comprises said forming profile contour (24) in said forming area (F);
   said forming area extends over an axial length of three times said mean thread radius ($R_M$) starting from a free end (25) of said shank to said forming area end (FE), said forming area comprising said forming profile contour at said forming area end;
   said main thread (18) comprises said bearing area and said bearing profile contour (22) that extends axially over a length of said threaded shank starting at a distance of ⅔ times said mean thread radius (RM) from said forming area end (FE);
   said bearing profile contour (22) is smaller than said forming profile contour (24) at least in a region which extends radially outwards from 85% of said forming area radius ($R_F$);
   when superimposed, said bearing profile contour (22) lies completely within said forming profile contour (24);
   a forming profile surface (26) which is delimited by said forming profile contour (24) and is measured in a range of 10% of said forming area radius ($R_F$) starting from said maximum orthogonal distance of said forming profile contour (24) to said screw center axis (M), is larger than a bearing profile surface (28) which is delimited by said bearing profile contour (22) and is measured in a range of 10% of said forming area radius ($R_F$) starting from said maximum orthogonal distance of the bearing profile contour to said screw center axis (M); and, said main thread (18) of said bearing area (T) is pressed against a flank of a counter thread formed into said plastic component (46) by said forming area (F) of said main thread only when said screw is fully engaged in said plastic component (46).

23. A screw connection (40) comprising:

a component (46) of a plastic material; and a screw screwed into the component, wherein the screw is the screw according to claim 1.

24. A method for producing a screw connection, the method comprising:

providing a screw according to claim 1; and screwing the screw into a pilot hole (44) made in a component (46) of plastic material, thus forming a counter thread into the component with the forming profile contour in the forming area (F), wherein the thread in the bearing area (T) does not contact the counter thread during the screwing of the screw, and wherein after the screwing of the screw the counter thread springs back and presses against the thread in the bearing area (T).

25. The method according to claim 24, wherein a radius of the pilot hole is 80% of the thread radius of the forming profile contour.

* * * * *

UNITED STATES PATENT AND TRADEMARK OFFICE
CERTIFICATE OF CORRECTION

PATENT NO. : 12,372,111 B2  
APPLICATION NO. : 17/251795  
DATED : July 29, 2025  
INVENTOR(S) : Michael Achenbach et al.

Page 1 of 1

It is certified that error appears in the above-identified patent and that said Letters Patent is hereby corrected as shown below:

In the Claims

Claim 13, Column 11, Line 3, after "shank" delete "have their beginning in the same place".

Signed and Sealed this  
Twenty-eighth Day of October, 2025

John A. Squires  
*Director of the United States Patent and Trademark Office*